US007912255B2

(12) United States Patent
Rahmes et al.

(10) Patent No.: US 7,912,255 B2
(45) Date of Patent: Mar. 22, 2011

(54) FINGERPRINT PROCESSING SYSTEM PROVIDING INPAINTING FOR VOIDS IN FINGERPRINT DATA AND RELATED METHODS

(75) Inventors: Mark Rahmes, Melbourne, FL (US); Josef Allen, Melbourne, FL (US); Patrick Kelley, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 1049 days.

(21) Appl. No.: 11/683,067

(22) Filed: Mar. 7, 2007

(65) Prior Publication Data
US 2008/0080752 A1  Apr. 3, 2008

Related U.S. Application Data

(63) Continuation-in-part of application No. 11/458,755, filed on Jul. 20, 2006, now Pat. No. 7,764,810.

(51) Int. Cl.
*G06K 9/00* (2006.01)
(52) U.S. Cl. ........ 382/124; 382/125; 382/128; 382/134; 382/173; 702/1; 702/2; 702/5; 702/6; 702/14; 702/16; 702/11; 702/12
(58) Field of Classification Search .................. 382/124, 382/125, 128, 134, 173
See application file for complete search history.

(56) References Cited

U.S. PATENT DOCUMENTS

| 6,987,520 | B2 | 1/2006 | Criminisi et al. | 345/629 |
|---|---|---|---|---|
| 7,750,902 | B2 | 7/2010 | Rahmes et al. | 345/420 |
| 7,760,913 | B2 | 7/2010 | Rahmes et al. | 382/109 |
| 7,764,810 | B2 | 7/2010 | Rahmes et al. | 382/109 |
| 2004/0114784 | A1* | 6/2004 | Fujii | 382/124 |
| 2006/0013442 | A1 | 1/2006 | McDowall et al. | 382/109 |
| 2006/0013443 | A1 | 1/2006 | McDowall et al. | 382/109 |
| 2006/0140461 | A1* | 6/2006 | Kim et al. | 382/126 |

OTHER PUBLICATIONS

Verdera et al., *Inpainting Surface Holes*, May 2, 2003.
Bertalmio et al., *Navier-Stokes, Fluid Dynamics, and Image and Video Inpainting*, Proceedings of the International Conference on Computer Vision and Pattern Recognition. IEEE, 2001, vol. 1, pp. 355-362.
Reigber et al., *Interference Suppression in Synthesized SAR Images*, IEEE Geoscience and Remote Sensing Letters, vol. 2, No. 1, pp. 45-49, Jan. 2005.
Limp, *Raster GIS Packages Finally Receive Well-Deserved Recognition*, Geoworld, 2006.
"Generating Contour Lines from 705 Min Dem Files" originally located at http://www.gis.usu.edu/Geography-Department/rsgis/howto/demgen/demgen.html, reprinted from Nov. 2, 2001 archive from Internet Archive Wayback Machine, http://web.archive.org/web/20011102033358/http://www.gis.usu.edu/Geography-Department/rsgis/howto/demgen/demgen.html.

* cited by examiner

*Primary Examiner* — Matt Bella
*Assistant Examiner* — Mike Rahmjoo
(74) *Attorney, Agent, or Firm* — Allen, Dyer, Doppelt, Milbrath & Gilchrist, P.A.

(57) ABSTRACT

A fingerprint processing system may include a fingerprint database for storing fingerprint data having at least one void therein. At least one processor may cooperate with the fingerprint database for inpainting data into the at least one void in the fingerprint data based upon propagating fingerprint contour data from outside the at least one void into the at least one void.

30 Claims, 24 Drawing Sheets

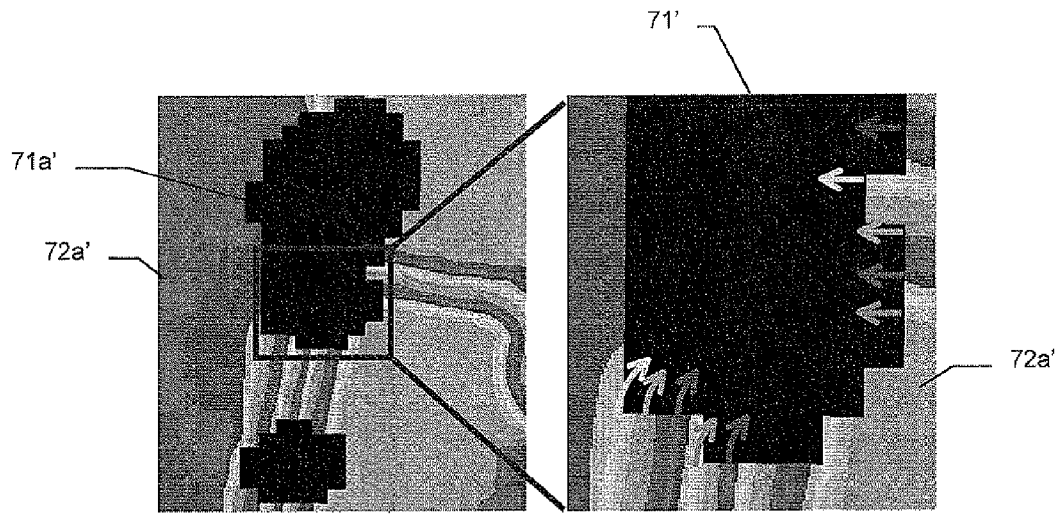
FIG. 7A  FIG. 7B
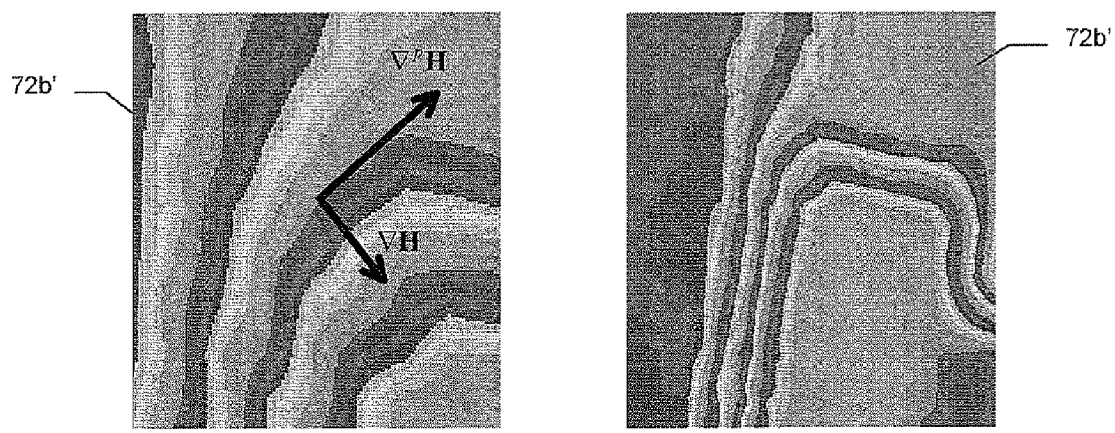
FIG. 7C  FIG. 7D

FINGERPRINT PROCESSING SYSTEM PROVIDING INPAINTING FOR VOIDS IN FINGERPRINT DATA AND RELATED METHODS

CROSS-REFERENCE TO RELATED APPLICATIONS

This application is a continuation-in-part of U.S. patent application Ser. No. 11/458,755 filed Jul. 20, 2006, now U.S. Pat. No. 7,764,810 the entire disclosure of which is incorporated by reference herein.

FIELD OF THE INVENTION

The present invention relates to the field of biometric identification systems, and, more particularly, to fingerprint processing systems and related methods.

BACKGROUND OF THE INVENTION

Fingerprint recognition systems are important tools in security and law enforcement applications. Generally speaking, a digital representation of an image is generated by a fingerprint sensor, etc., which is then digitally processed to create a template of extracted fingerprint features or "minutiae," such as arches, loops, whorls, etc., that can then be compared with previously stored reference templates for matching purposes. Yet, it is common during the collection process for data corresponding to particular regions or areas of a fingerprint to be compromised as a result of smudging, etc., which results in missing data portions or voids in the fingerprint data field. Such voids decrease the available feature set that can be extracted from the fingerprint data, which in turn reduces the accuracy of the template generated therefrom and potentially compromises the ability to perform correct matching based thereon.

Various interpolation techniques are generally used for filling in missing data in a data field. One such technique is sinc interpolation, which assumes that a signal is band-limited. While this approach may be well suited for communication and audio signals, it may not be as well suited for contoured data, such as fingerprint data. Another approach is polynomial interpolation. This approach is sometimes difficult to implement because the computational overhead may become overly burdensome for higher order polynomials, which may be necessary to provide desired accuracy.

One additional interpolation approach is spline interpolation. While this approach may provide a relatively high reconstruction accuracy, it may also be problematic to implement in contoured data sets because of the difficulty in solving a global spline over the entire model, and because the required matrices may be ill-conditioned. One further drawback of such conventional techniques is that they tend to blur edge content, which may be a significant problem in a fingerprint identification system.

Another approach for filling in regions within an image is set forth in U.S. Pat. No. 6,987,520 to Criminisi et al. This patent discloses an examplar-based filling system which identifies appropriate filling material to replace a destination region in an image and fills the destination region using this material. This is done to alleviate or minimize the amount of manual editing required to fill a destination region in an image. Tiles of image data are "borrowed" from the proximity of the destination region or some other source to generate new image data to fill in the region. Destination regions may be designated by user input (e.g., selection of an image region by a user) or by other means (e.g., specification of a color or feature to be replaced). In addition, the order in which the destination region is filled by example tiles may be configured to emphasize the continuity of linear structures and composite textures using a type of isophote-driven image-sampling process.

Despite the advantages such prior art approaches may provide in certain applications, further advancements may be desirable for filling voids in fingerprint data, for example.

SUMMARY OF THE INVENTION

In view of the foregoing background, the present disclosure presents a fingerprint processing system and related methods which may advantageously help fill voids within fingerprint data.

This and other objects, features, and advantages are provided by a fingerprint processing system that may include a fingerprint database for storing fingerprint data having at least one void therein. In addition, at least one processor may cooperate with the fingerprint database for inpainting data into the at least one void in the fingerprint data based upon propagating fingerprint contour data from outside the at least one void into the at least one void. In some embodiments, a fingerprint sensor may be included for collecting the fingerprint data with a void(s) therein.

More particularly, the fingerprint data may comprise ridge contour data, for example. As such, the at least one processor may inpaint by propagating ridge contour data from outside the at least one void along a direction of lines of constant ridge contour from outside the at least one void into the at least one void. Moreover, the at least one processor may iteratively propagate the ridge contour data from outside the at least one void into the at least one void.

The fingerprint data may comprise frequency domain data, for example, and the at least one void may therefore comprise at least one frequency void. Thus, the at least one processor may cooperate with the fingerprint database for inpainting data into the at least one frequency void based upon propagating amplitude data for frequencies outside the frequency void into the frequency void.

The at least one processor may advantageously perform inpainting based upon at least one turbulent fluid flow modeling equation. More particularly, the at least one turbulent fluid flow modeling equation may be at least one Navier-Stokes equation, for example.

In addition, the at least one processor may further perform steps such as binarization, skeletonization, and/or minutiae extraction following inpainting, for example. Additionally, the at least one processor may further compare inpainted fingerprint data with a plurality of fingerprint data reference sets to determine at least one potential matching set therefrom. A display may also be coupled to the at least one processor for displaying fingerprint images produced thereby.

A fingerprint processing method aspect may include providing fingerprint data having at least one void therein, and inpainting data into the at least one void in the fingerprint data based upon propagating fingerprint contour data from outside the at least one void into the at least one void. A computer-readable medium is also provided which may have computer-executable instructions for causing a processor to perform one or more steps comprising inpainting data into the at least one void in fingerprint data based upon propagating fingerprint contour data from outside the at least one void into the at least one void.

BRIEF DESCRIPTION OF THE DRAWINGS

FIGS. 7A-7D are a series of close-up views of a void in geospatial model cultural feature data illustrating the inpainting technique used in FIG. 6 in greater detail.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternative embodiments.

Generally speaking, the present description presents techniques for using inpainting techniques to advantageously fill voids in data fields, including time domain and frequency domain data fields, to provide enhanced resolution in images or other representations derived from the inpainted data fields. These techniques are first described in the context of geospatial modeling data and systems, and their application to other data types, such as fingerprint data, are discussed thereafter.

Figure 1:
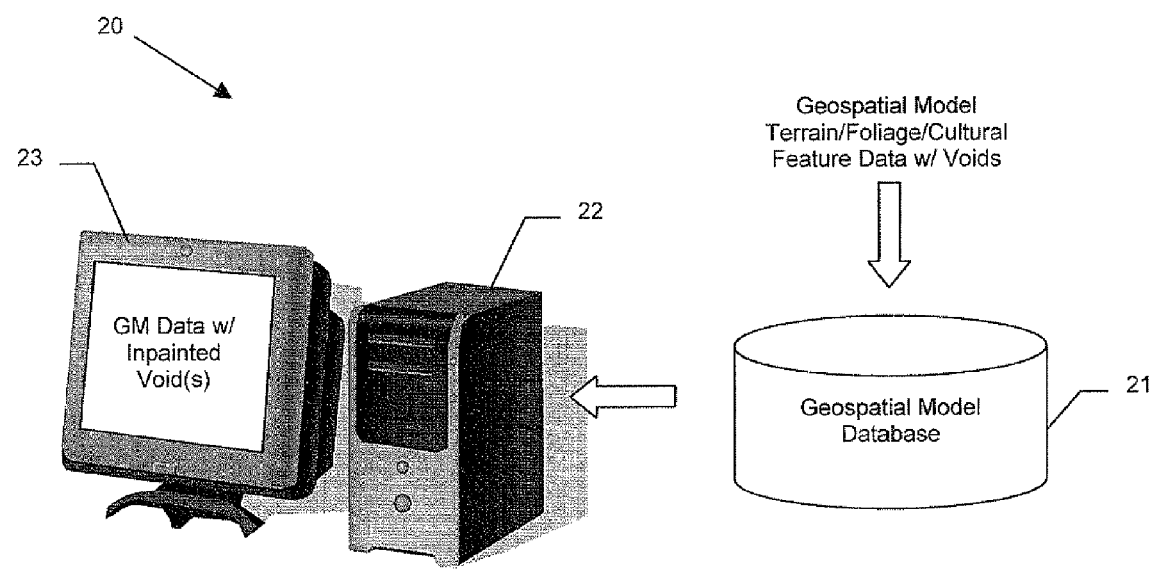
FIG. 1 is a schematic block diagram of a geospatial modeling system in accordance with the invention.

Referring initially to FIG. 1, a geospatial modeling system 20 illustratively includes a geospatial model database 21 and a processor 22, such as a central processing unit (CPU) of a PC, Mac, or other computing workstation, for example. A display 23 may be coupled to the processor 22 for displaying geospatial modeling data, as will be discussed further below.

Figure 2:
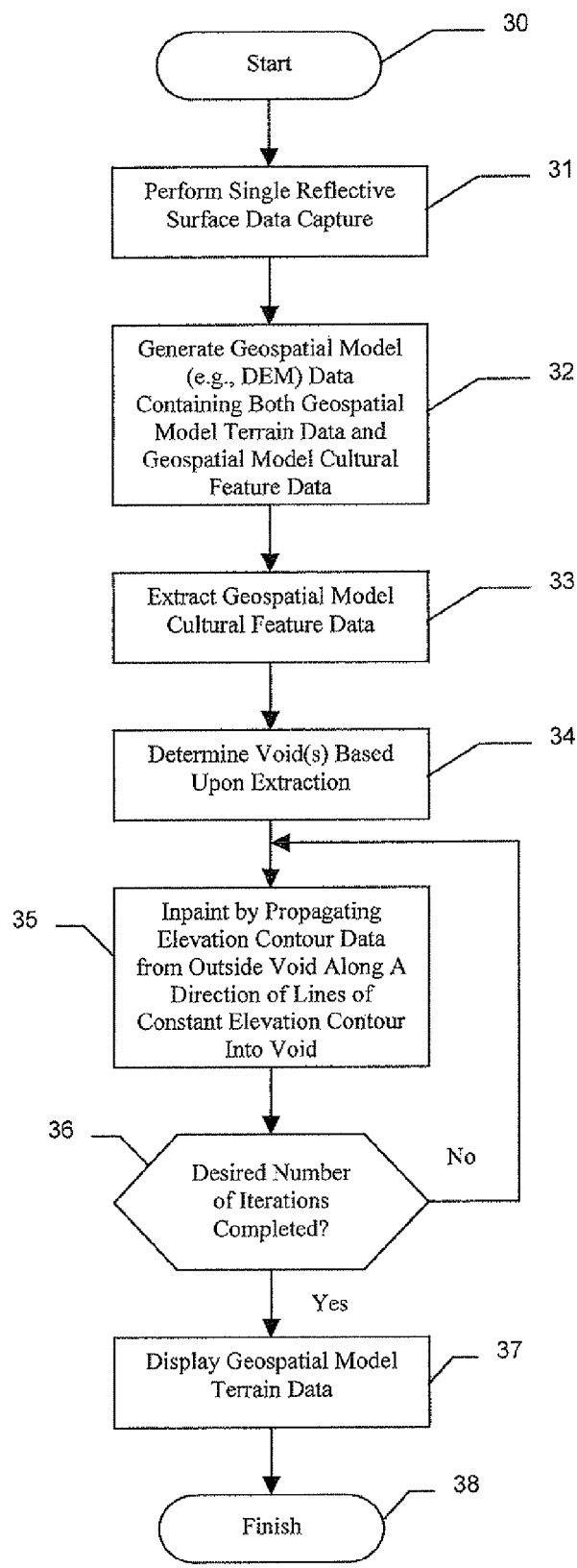
FIG. 2 is a flow diagram illustrating a geospatial modeling method aspect for void inpainting within geospatial model terrain data in accordance with the invention.

Turning additionally to FIGS. 2-4, an approach for inpainting data into one or more voids in geospatial model terrain data is now described. Beginning at Block 30, one or more data captures are performed for the geographical area of interest to obtain 3D elevation versus position data. The data capture may be performed using various techniques, such as stereo optical imagery, Light Detecting And Ranging (LIDAR), Interferometric Synthetic Aperture Radar (IFSAR), etc. Generally speaking, the data will be captured from nadir views of the geographical area of interest by airplanes, satellites, etc., as will be appreciated by those skilled in the art. However, oblique images of a geographical area of interest may also be used in addition to or instead of the images to add additional 3D detail to a geospatial model.

In the illustrated example, a single reflective surface data capture is performed to provide the 3D data of the geographical area of interest, at Block 31. The "raw" data provided from the collection will typically include terrain, foliage, and/or cultural features (e.g., buildings). The processor 22 uses this raw data to generate a geospatial model (i.e., DEM) of the elevation verses position data based upon the known position of the collectors, etc., at Block 32, using various approaches which are known to those skilled in the art. Of course, in other embodiments the DEM may be generated by another computer and stored in the geospatial model database 21 for processing by the processor 22. The DEM data may have a relatively high resolution, for example, of greater than about thirty meters to provide highly accurate image detail, although lower resolutions may be used for some embodiments, if desired. In some embodiments, resolutions of one meter or better may be achieved.

Figure 3A:
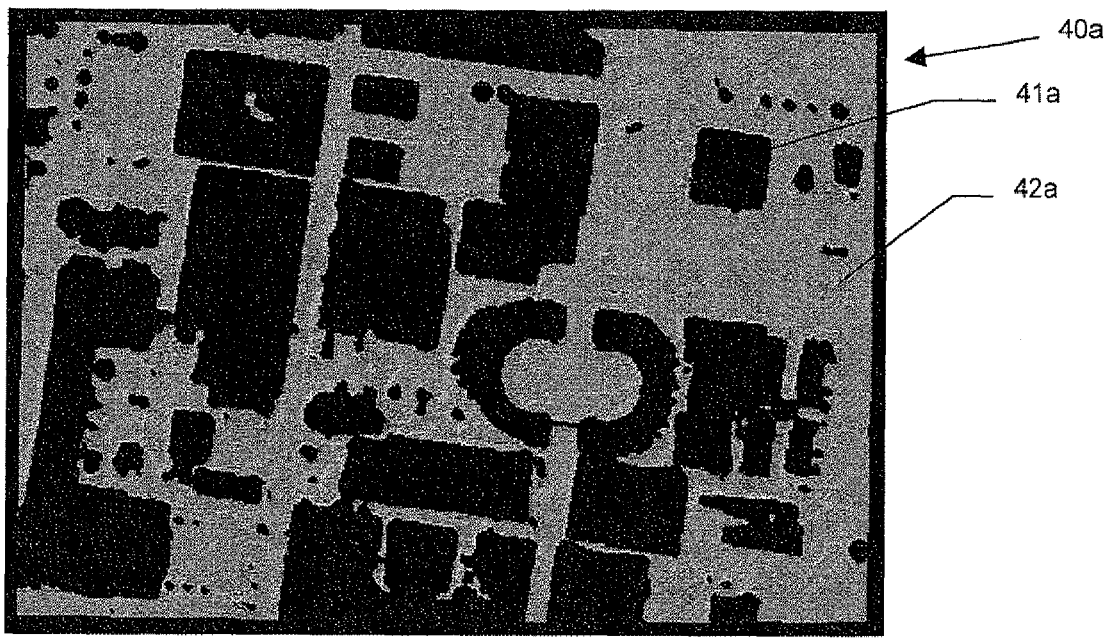
FIGS. 3A-3B are nadir views of geospatial model terrain data in a DEM before and after void inpainting in accordance with the invention.
Figure 3B:
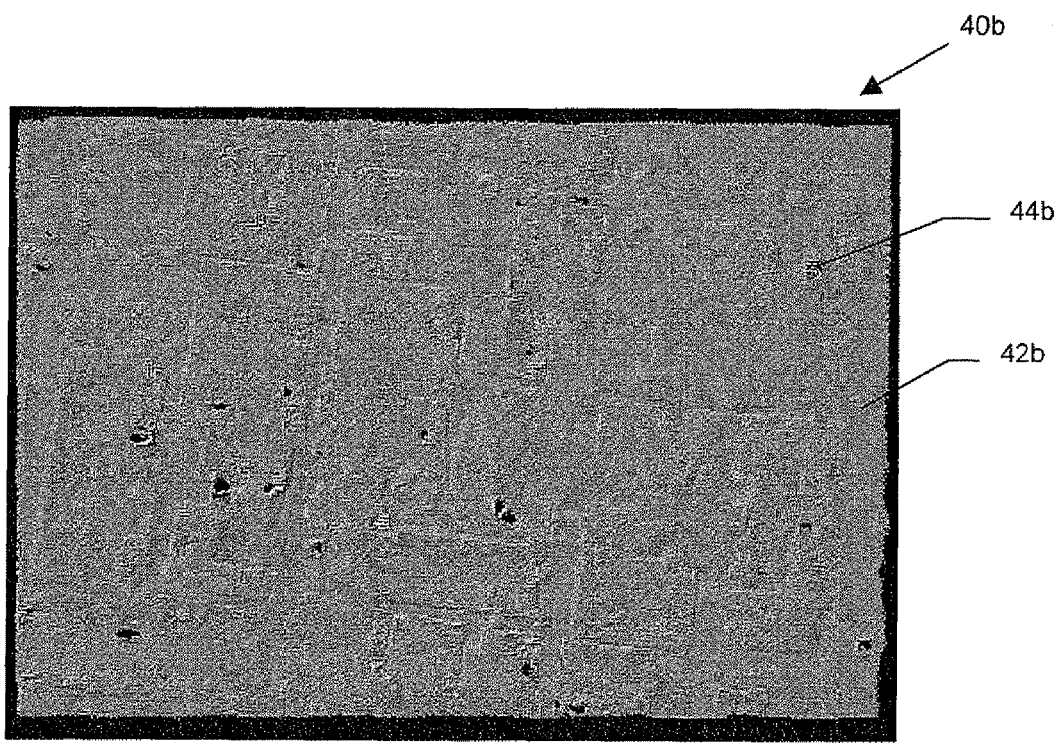

In many instances it is desirable to separate or extract one of the above-noted types of data from a geospatial model. For example, in some cases it may be desirable to remove the cultural features from a DEM so that only the terrain and/or foliage remains, at Block 33. In particular, the extraction process may include a series of DEM re-sampling, null filling, DEM subtraction, and null expanding steps, as will be appreciated by those skilled in the art. Yet, extracting the cultural features would ordinarily leave holes or voids within the DEM. A DEM 40a is shown in FIGS. 3A and 3B in which voids 41a appear in terrain 42a where buildings have been extracted.

When features have been extracted from the geospatial model, this makes determination of voids to be filled (Block 34) relatively straightforward, as these voids will occur where the cultural feature or other data has been extracted. However, in some embodiments the voids may result from causes other than data extraction, such as a blind spot of a collector, clouds over a geographical area or interest, etc. The approach described herein may also be used to correct such voids as well.

Figure 4A:
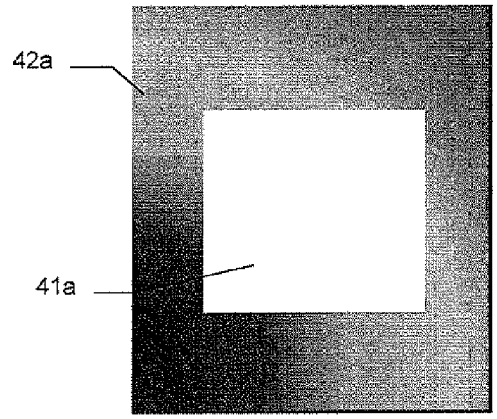
FIGS. 4A-4D are a series of close-up views of a void in geospatial model terrain data illustrating the inpainting technique used in FIGS. 3A and 3B in greater detail.
Figure 4B:
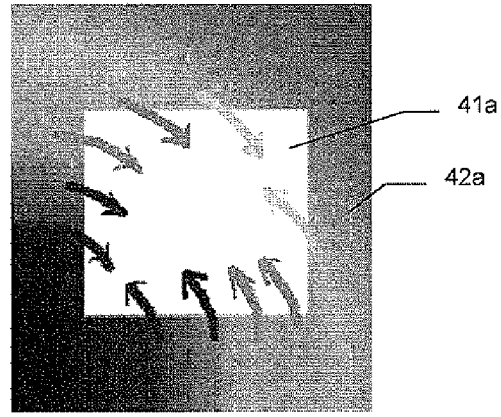
Figure 4C:
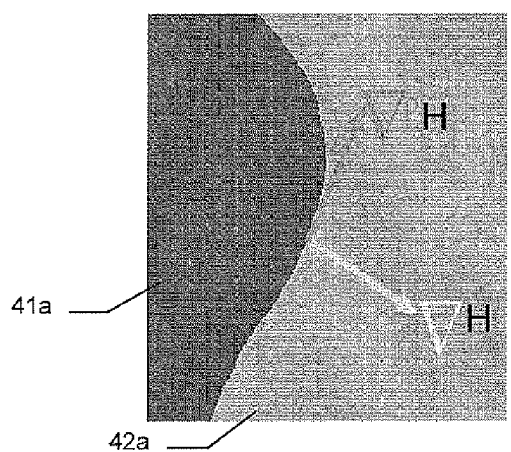

Generally speaking, the voids 41a are inpainted by propagating contour data from outside a given void into the given void, at Block 35. More particularly, the processor 22 inpaints by propagating elevation contour data from outside the given void along a direction of lines of constant elevation contour from outside the given void into the void, as seen in FIGS. 4A-4D. More particularly, the lines of constant elevation contour may be based upon isophote ($\nabla^P H$) and gradient ($\nabla H$) directions at given points along the void boundary, as shown in FIG. 4C. As will be appreciated by those skilled in the art, inpainting is a non-linear interpolation technique which in the present example is used to propagate the data from the area around a void created by an extracted building to "fill" the void.

More particularly, the processor 22 propagates elevation information from outside the void along a direction of iso-contour, as represented by the following equation:

$$\frac{\partial I}{\partial t} = \nabla L \cdot N, \quad (1)$$

where $\nabla L$ is a discrete Laplacian transform. An iso-contour direction N is obtained by taking a 90 degree rotation of the DEM gradient, as will be appreciated by those skilled in the art. An inpainting equation for performing the above-noted propagation is as follows:

$$H^{n+1}(i,j) = H^n(i,j) + \Delta t H_t^n(i,j), \forall (i,j) \in \Omega. \quad (2)$$

Figure 4D:
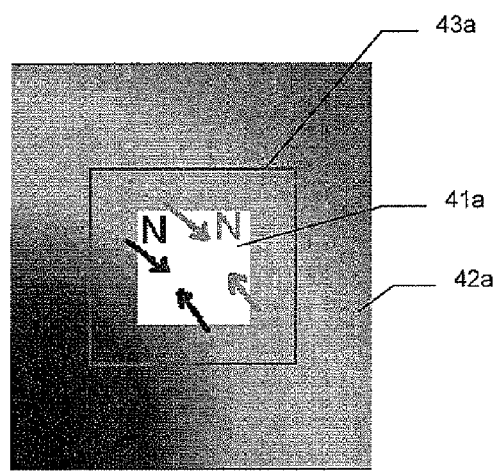

The above-noted propagation is performed a certain number of iterations to "shrink" the void to a desired size as seen in FIG. 4D. The starting boundary 43a of the void is shown in FIG. 4D so that the amount of propagation from one iteration may be seen. After the desired number of iterations are performed, at Block 36, then the final geospatial model terrain data 40b may be displayed on the display 23, at Block 37, thus concluding the illustrated method (Block 38). In the present example, 4000 iterations of propagation were used for inpainting the voids 41a in the geospatial model terrain data, but more or less numbers of iterations may be used in different embodiments depending upon the required accuracy and the computational overhead associated therewith.

Generally speaking, the above-described approach essentially treats a DEM as an incompressible fluid, which allows fluid mechanics techniques to be used for filling in the voids. That is, the partial differential equations outlined above are used to estimate how the boundaries directly adjacent a void in the 3D model would naturally flow into and fill the void if the DEM were considered to be an incompressible fluid, as will be appreciated by those skilled in the art.

This approach advantageously allows for autonomous reconstruction of bare earth in places where buildings or other cultural features have been removed, yet while still retaining continuous elevation contours. Moreover, the non-linear interpolation technique of inpainting allows for accurate propagation of data from the area surrounding a void boundary. Further, the DEM may advantageously be iteratively evolved until a steady state is achieved, and the speed of propagation may be controlled to provide a desired tradeoff between accuracy of the resulting geospatial data and the speed so that the processing overhead burden does not become undesirably large, as will be appreciated by those skilled in the art.

Figure 5:
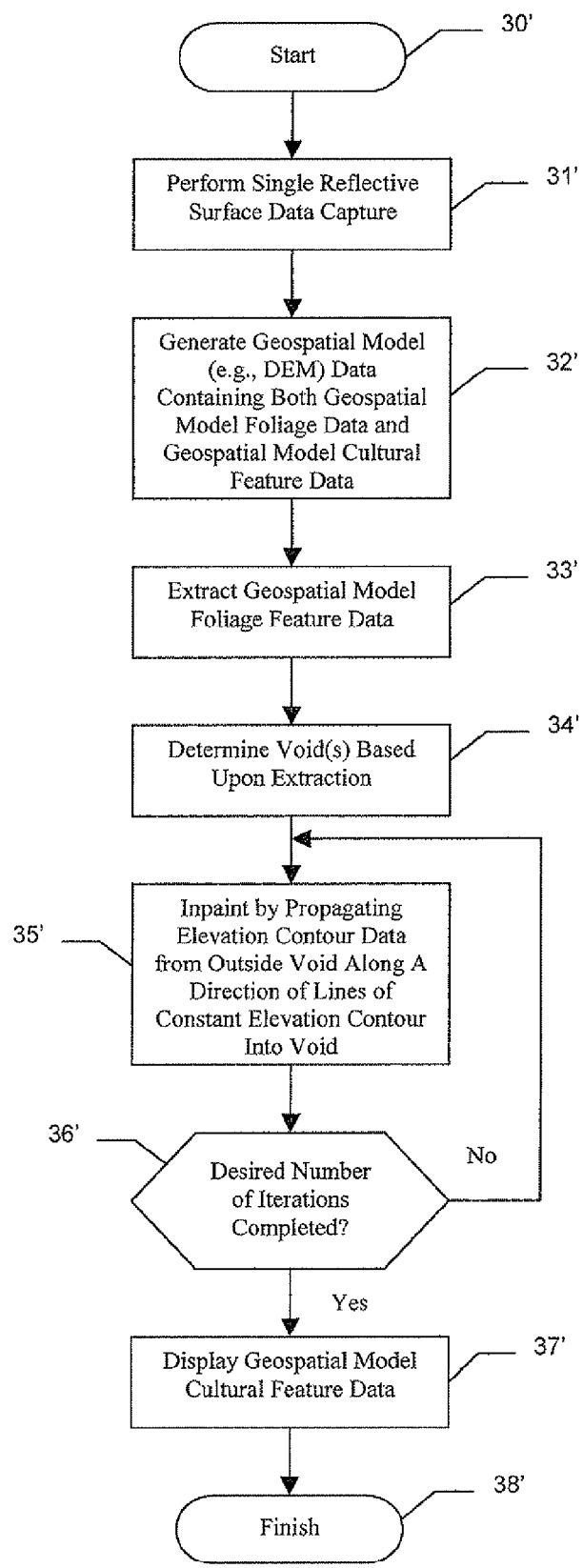
FIG. 5 is a flow diagram illustrating an alternative geospatial modeling method aspect for void inpainting within geospatial model cultural feature data in accordance with the invention.
Figure 6:
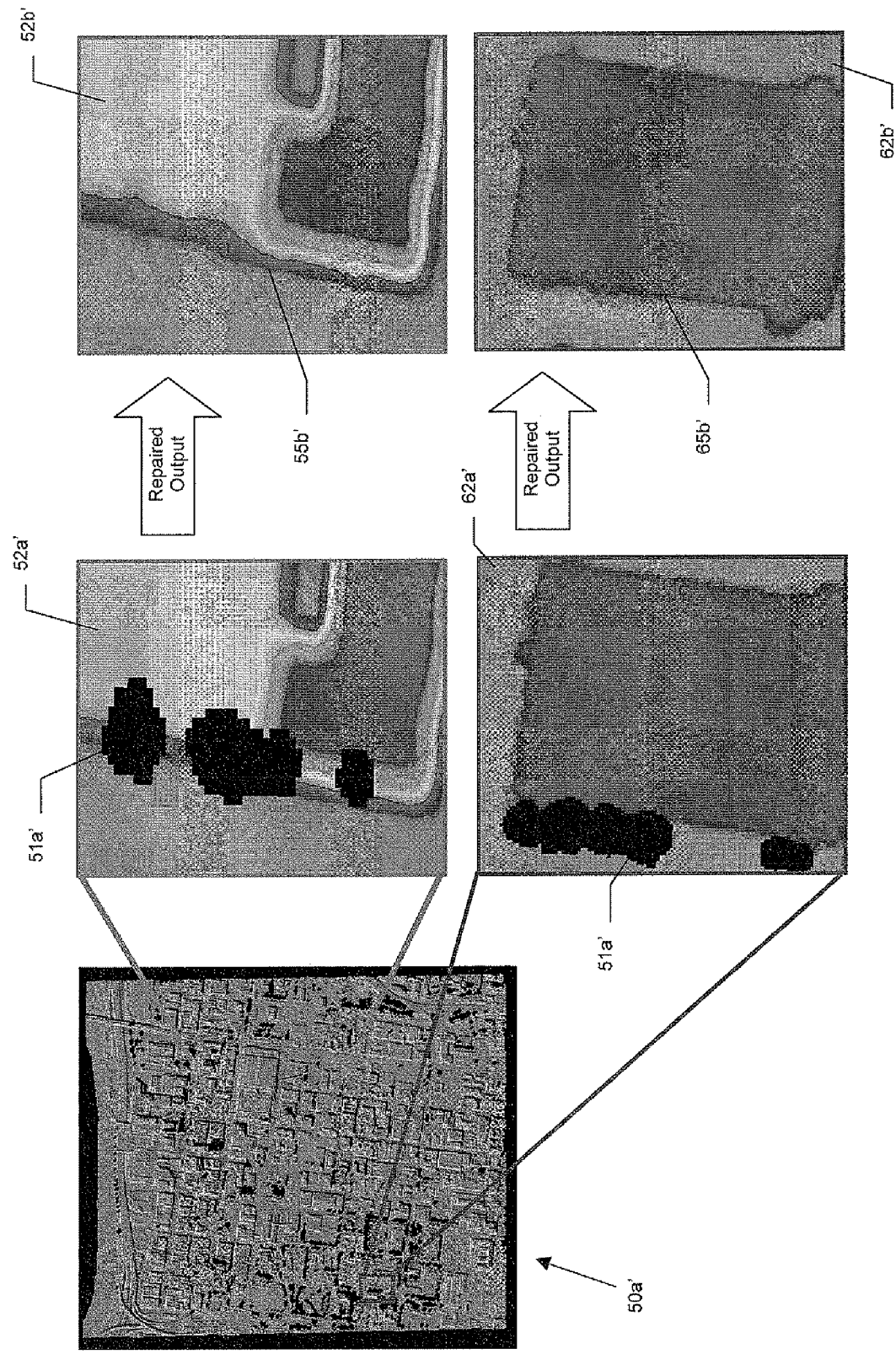
FIG. 6 is a view of geospatial model cultural feature data in a DEM before and after void inpainting in accordance with the method illustrated in FIG. 5.
Figure 8:
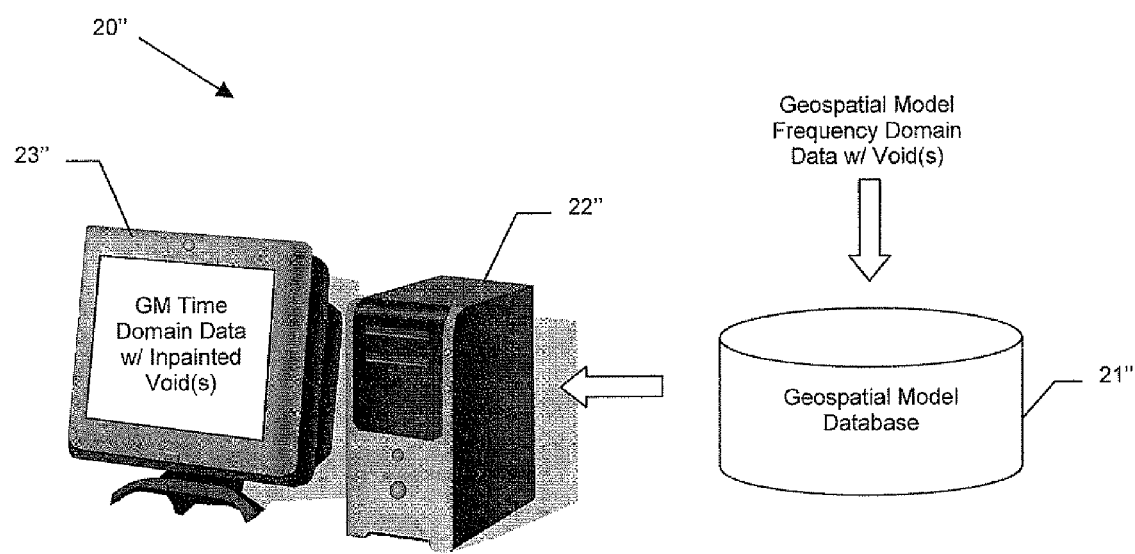
FIG. 8 is a schematic block diagram of an alternative geospatial modeling system in accordance with the invention for void inpainting within geospatial model frequency domain data.
Figure 9:
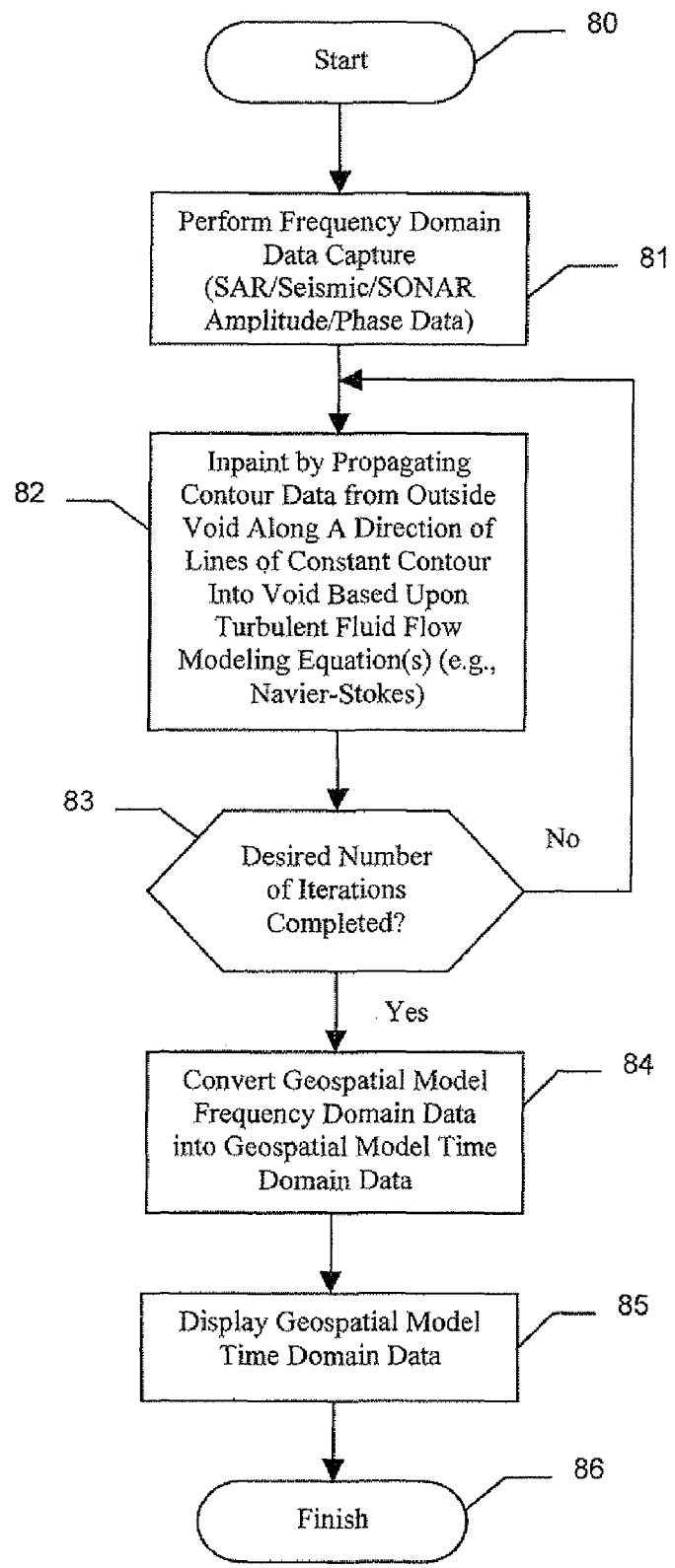
FIG. 9 is a flow diagram illustrating an alternative geospatial modeling method aspect of the invention for void inpainting within geospatial model frequency domain data.

The above-described approach may similarly be used to reconstruct other features besides terrain. More particularly, it may be used to perform inpainting on voids in a cultural feature (e.g., building) resulting from foliage, etc., that obscures part of the cultural feature. Turning now additionally to FIGS. 5-7, the processor 22 may cooperate with the geospatial model database 21 for inpainting data into one or more voids 51a in geospatial model cultural feature data 50a caused by the extraction of foliage (i.e., tree) data from the DEN, at Block 33'. By way of example, the foliage extraction may be performed based upon the color of the data (if color data is provided), as well as the color gradient of the data, as will be appreciated by those skilled in the art. Of course, other suitable foliage extraction techniques may also be used. Once again, the voids 51a may be determined based upon the location of the foliage that is extracted.

As discussed above, the processor 22 inpaints by iteratively propagating elevation contour data from outside the voids 51a in data portions 52a, 62a along a direction of lines of constant elevation contour from outside the voids into the voids, at Blocks 35'-36', to produce the final "repaired" data portions 52b, 62b in which building edges 55b', 65b' are now complete and continuous. The inpainting process is further illustrated in FIGS. 7A-7D, in which elevation information (as visually represented by the different shading) from the bordering region of a data portion 72a around a void 71 is propagated into the void (FIGS. 7A and 7B) based upon the following relationship:

$$\frac{\partial H}{\partial t} = \nabla L \cdot N, \quad (3)$$

where $\nabla H$ is the DEM gradient and $\nabla^P H$ is the iso-contour direction to produce the repaired data section 72b (FIGS. 7C and 7D). Here again, the above-noted equation (2) may be used. This approach advantageously allows for the autonomous creation of high resolution DEMs of cultural features (e.g., buildings). Moreover, this may be done while maintaining building elevation consistency and edge sharpness of the identified inpainted regions.

Turning additionally to FIGS. 8 through 13, yet another system 20" for geospatial model frequency domain data to void inpainting is now described. Here again, the system 20" illustratively includes a geospatial model database 21", a processor 22", and a display 23" coupled to the processor, which may be similar to the above-described components. However, in this embodiment the geospatial model database 21" stores geospatial model frequency domain data for processing by the processor 22". By way of example, the frequency domain data may be captured using a SAR, SONAR, or seismic collection device, for example, as will be appreciated by those skilled in the art, at Blocks 80-81. The example that will be discussed below with reference to FIGS. 10-13 is based upon SAR frequency domain data.

Figure 10:
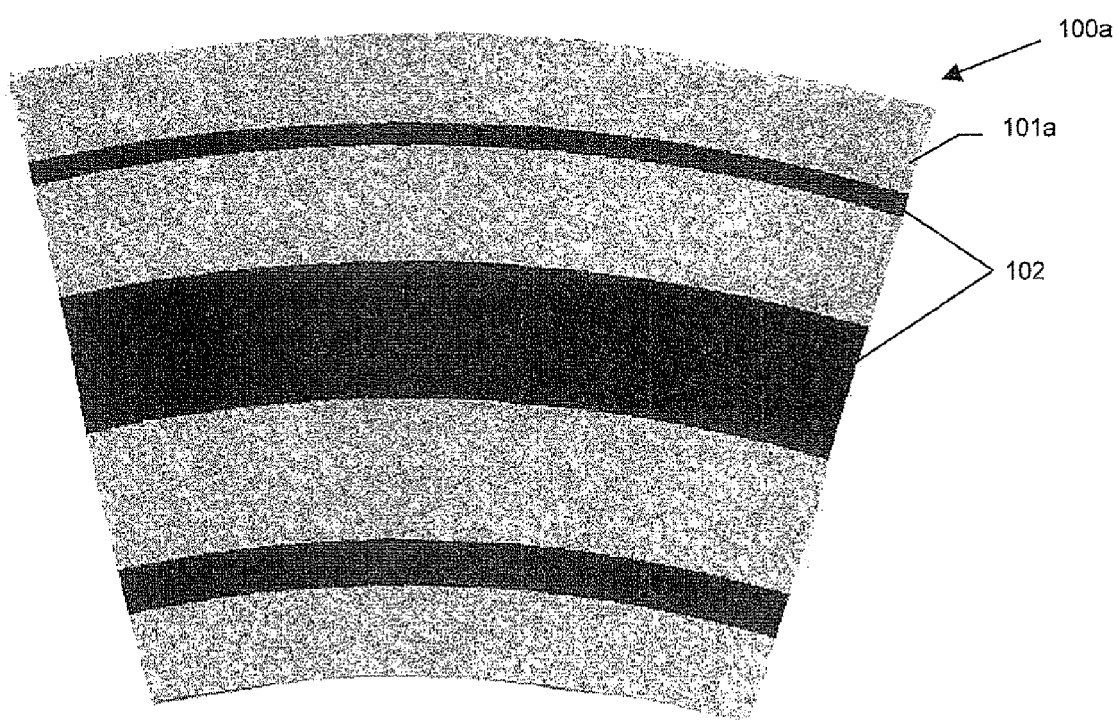
FIG. 10 is a K-space frequency domain representation of the U.S. Capitol building from a SAR with voids therein.
Figure 11:
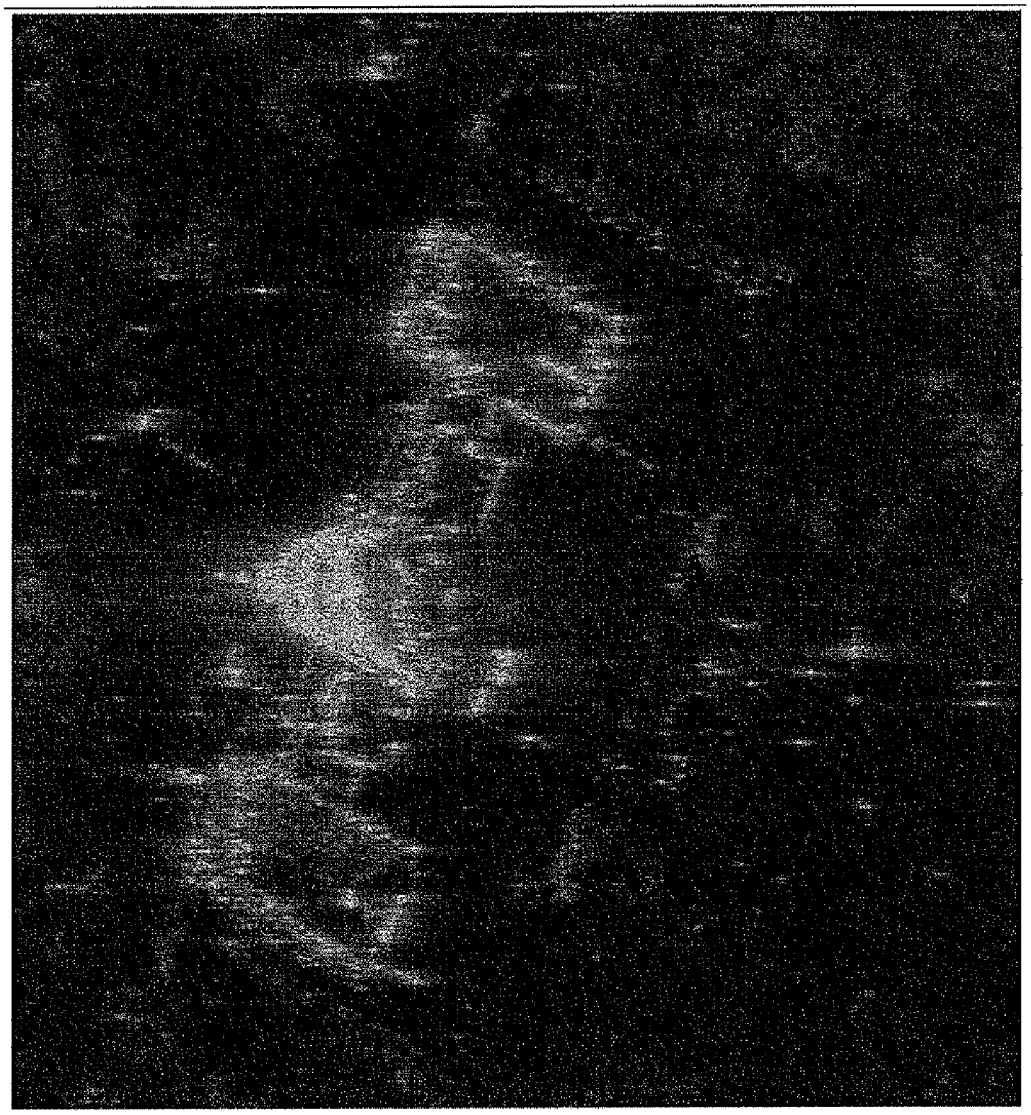
FIG. 11 is a time spatial equivalent image of the frequency domain data of FIG. 10.

More particularly, a frequency domain data map 100 illustrated in FIG. 10 is a K-apace representation of phase/amplitude data 101 from a SAR scan of the U.S. Capitol building. For purposes of the present example, certain bands 102 of phase/amplitude data have been removed from the phase map to represent the effects of missing frequency data. More particularly, such missing data bands 102 typically result from the notching of particular frequencies to avoid interference with other RF emitters, from hardware malfunctions that result in pulse dropouts, RF interference, etc. It should be noted that in the present example the bands 102 have been manually removed for illustrational purposes, and are not the result of notching, hardware malfunction, etc. The missing data bands 102 may therefore be treated as voids in the frequency domain data representation. The result of these voids is a blurred or distorted spatial domain representation of the SAR data 110a when converted to the spatial domain, as shown in FIG. 11. That is, the voids result in a degraded spatial domain image with a high multiplicative noise ratio (MNR), as will be appreciated by those skilled in the art.

However, the above-described inpainting techniques may also advantageously be used for repairing such voids in geographical model frequency domain data. More particularly, the processor 22" cooperates with the geospatial model database 21" for inpainting data into the missing data bands 102 (i.e., voids) based upon propagating contour data from outside the voids into the voids, at Block 82. More particularly, the propagation occurs along a direction of lines of constant contour from outside the voids into the voids. Yet, rather than being based on elevation contour data as in the above-described examples, here the contour data corresponds to the phase and amplitude values of the data surrounding the voids. Here again, the propagation is preferably iteratively performed a desired number of iterations (Block 83), or until a steady state is achieved, as will be appreciated by those skilled in the art.

Once again, this approach is based upon reconstructing data for frequencies that are missing from a frequency domain representation of a geographical area of interest by modeling the spectral signatures that are present in the data surrounding the voids as a turbulent (i.e., fluid) flow. That is, each individual known frequency is treated as a particle in an eddy flow, which are small turbulence fields inside of a general turbulence field. As such, the known "eddies" in the frequency domain data can therefore be modeled to interpolate the missing values.

Generally speaking, the processor 22" performs inpainting based upon one or more turbulent fluid flow modeling equations. By way of example, Navier-Stokes fluid mechanics equations/relationships may be used with some modification for K-space. More particularly, the stream function will have two components rather than one as follows:

$$\Psi = A(k_x, k_y) e^{z\phi(k_x, k_y)} = R(k_x, k_y) + zQ(k_x, k_y), \quad (4)$$

where the functions A, R, and Q are four times differentiable, and $z = \sqrt{-1}$. Thus, looking at the derived equations with respect to image intensities results in the following:

$$\frac{\partial}{\partial t}(\nabla^2 \Psi) + (v \cdot \nabla)(\nabla^2 \Psi) = v\nabla^2 \cdot (\nabla^2 \Psi). \quad (5)$$

A similar Navier-Stokes approach may also be used for the terrain/cultural feature void inpainting operations described above, as will be appreciated by those skilled in the art.

Figure 12:
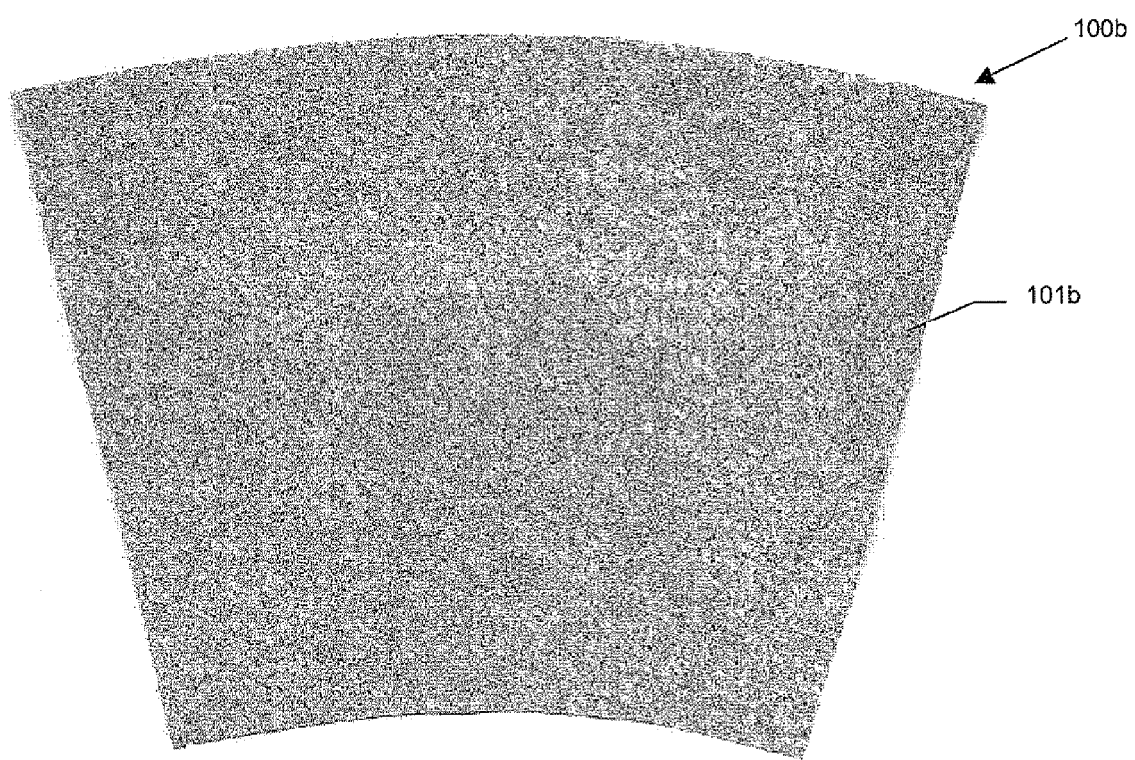
FIG. 12 is an representation of the K-space frequency domain data of FIG. 10 as it would appear after void inpainting in accordance with the method shown in FIG. 9.
Figure 13:
FIG. 13 is a spatial domain equivalent image of the frequency domain representation of FIG. 12.
Figure 14A:
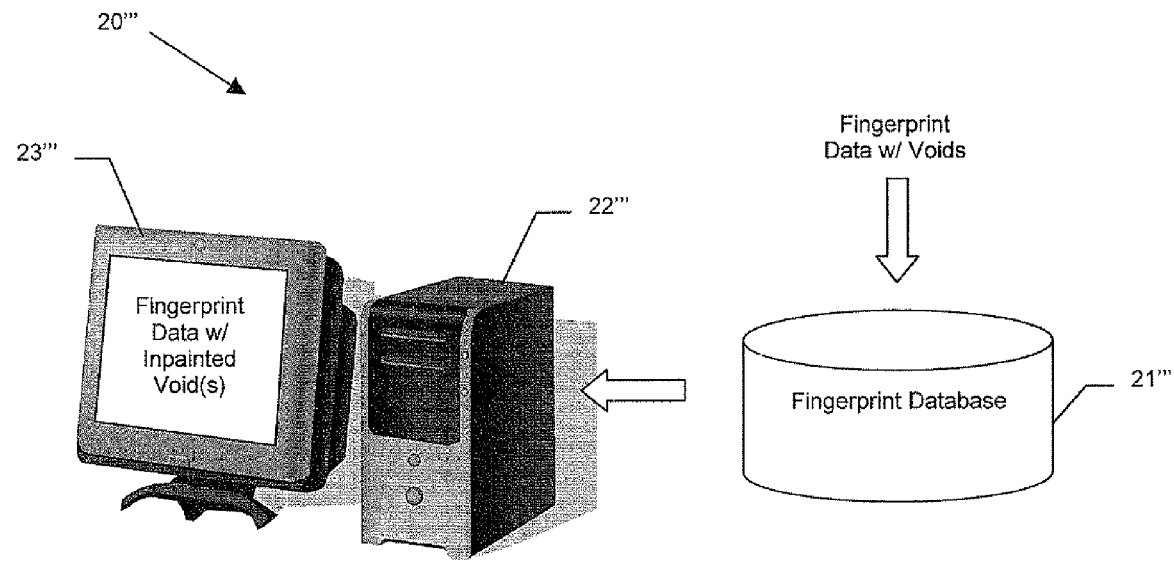
FIG. 14A is a schematic block diagram of a fingerprint processing system in accordance with the invention for void inpainting within fingerprint data.
Figure 14B:
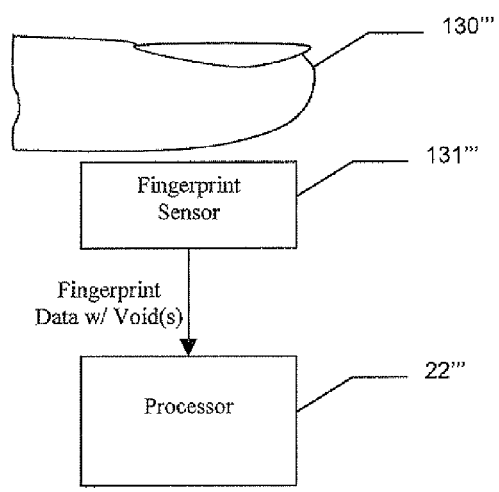
FIG. 14B is a schematic block diagram of the system of FIG. 14A including a fingerprint sensor.
Figure 15:
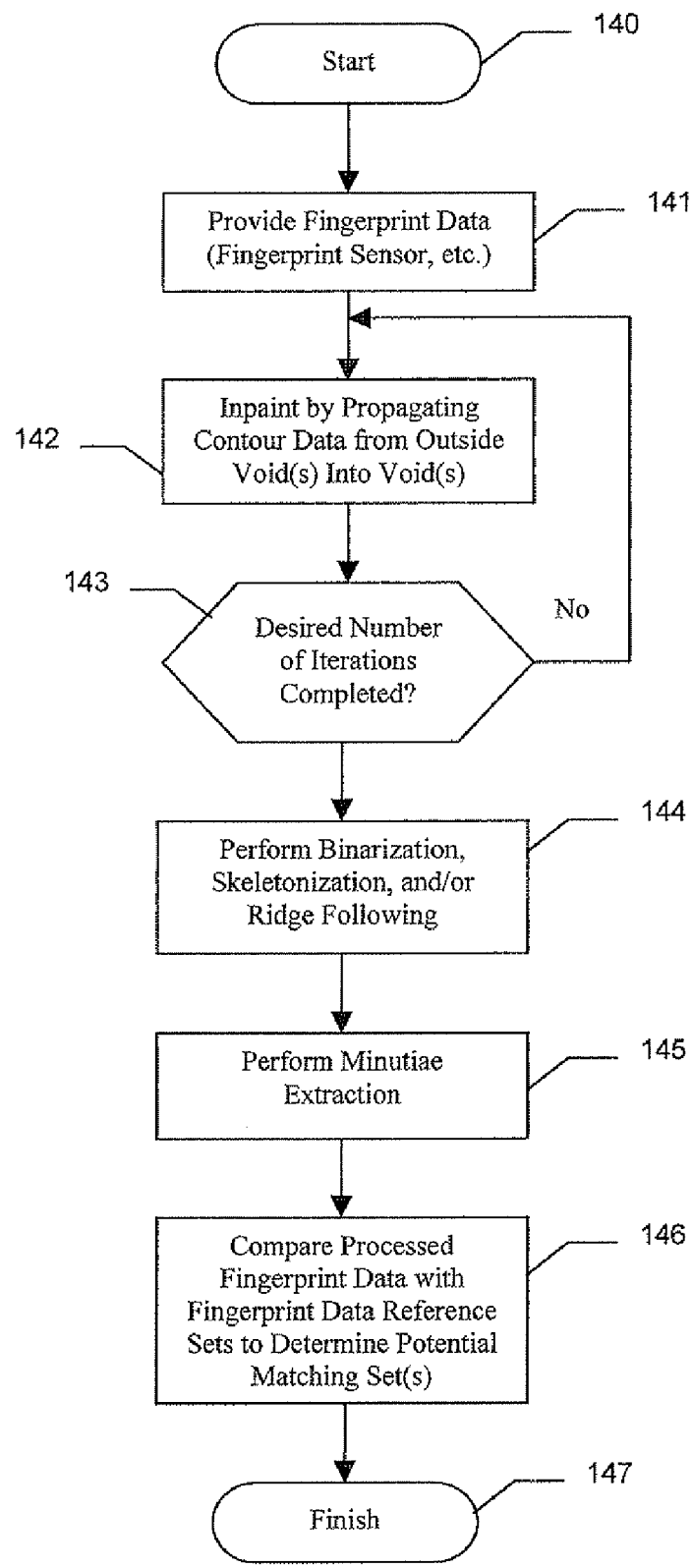
FIG. 15 is a flow diagram of a fingerprint processing method in accordance with the invention providing void inpainting in fingerprint data.

After the iterative propagation is completed using the above-described approach, the K-space map 100b is "repaired" with the missing data bands 102a no longer present (or substantially diminished), as shown in FIG. 12, which when converted to the spatial domain (Block 84) provides the substantially less distorted spatial domain image of the Capital 110b shown in FIG. 13. Here again, it should be noted that the representation in FIG. 12 has not actually been repaired using inpainting techniques as described above; rather, this is an actual K-space representation of the Capitol building without any voids therein. However, applicants theorize that using the above-described approach will provide a close approximation of the representation 110b of FIG. 13, as will be appreciated by those skilled in the art. Once the inpainting is complete, the geospatial model spatial domain data may be displayed on the display 23", if desired, at Block 85, and/or stored in the geospatial model database 21", etc., thus concluding the illustrated method (Block 86).

Figure 16A:
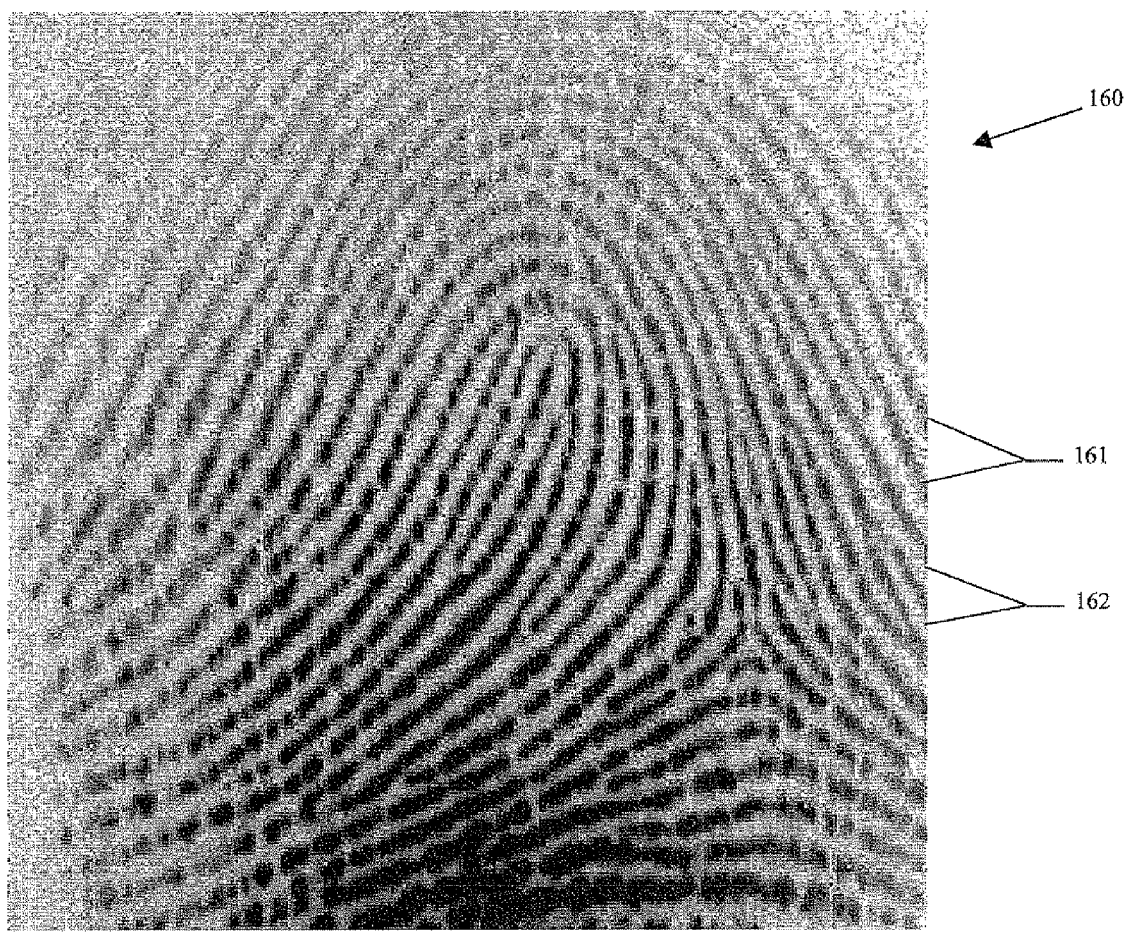
FIG. 16A is a close-up view of a reference fingerprint with no voids in the data field thereof.
Figure 16B:
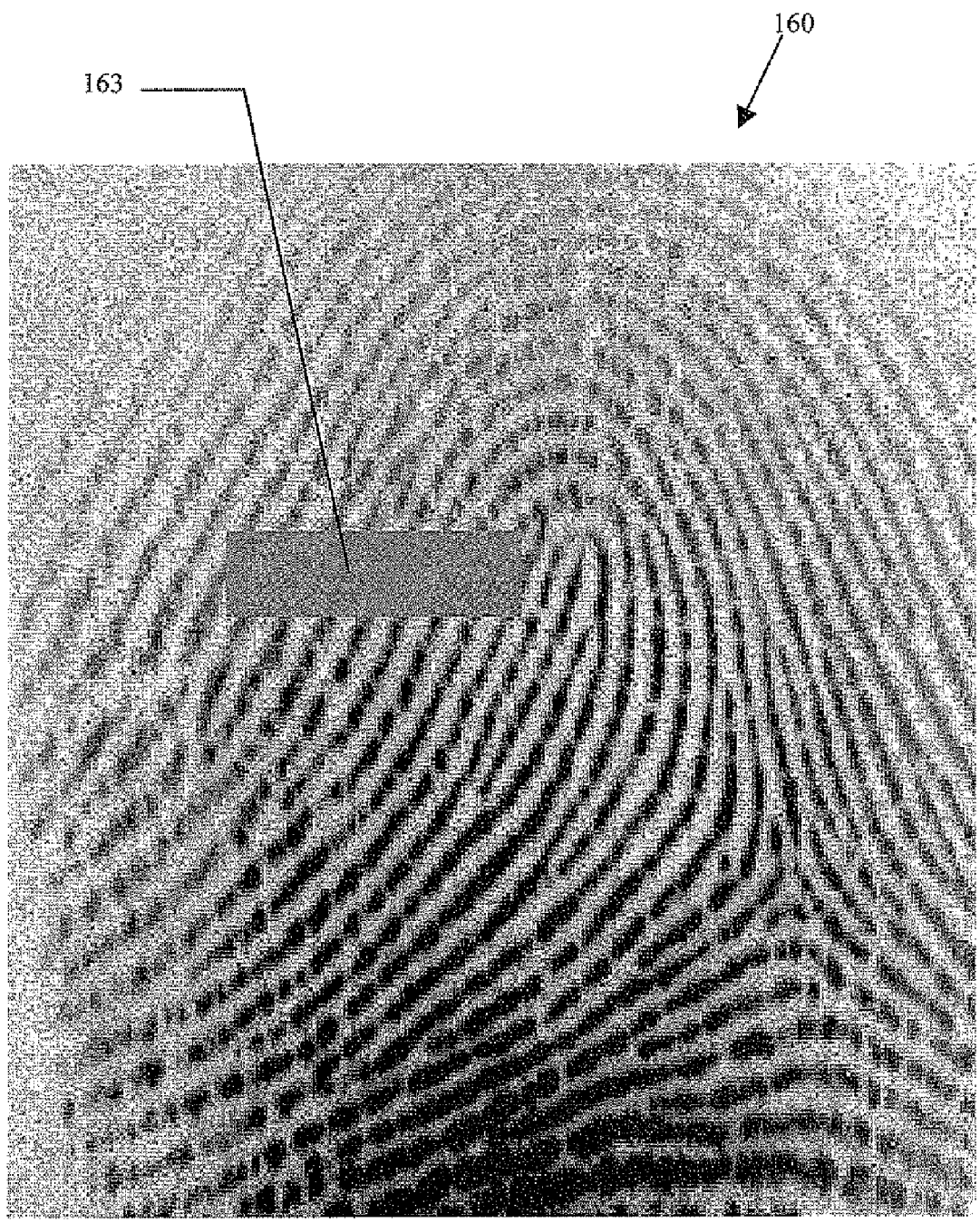
FIGS. 16B and 16C are close-up views of the reference fingerprint of FIG. 16A before and after inpainting in accordance with the invention to fill a void therein.
Figure 16C:
Figure 17A:
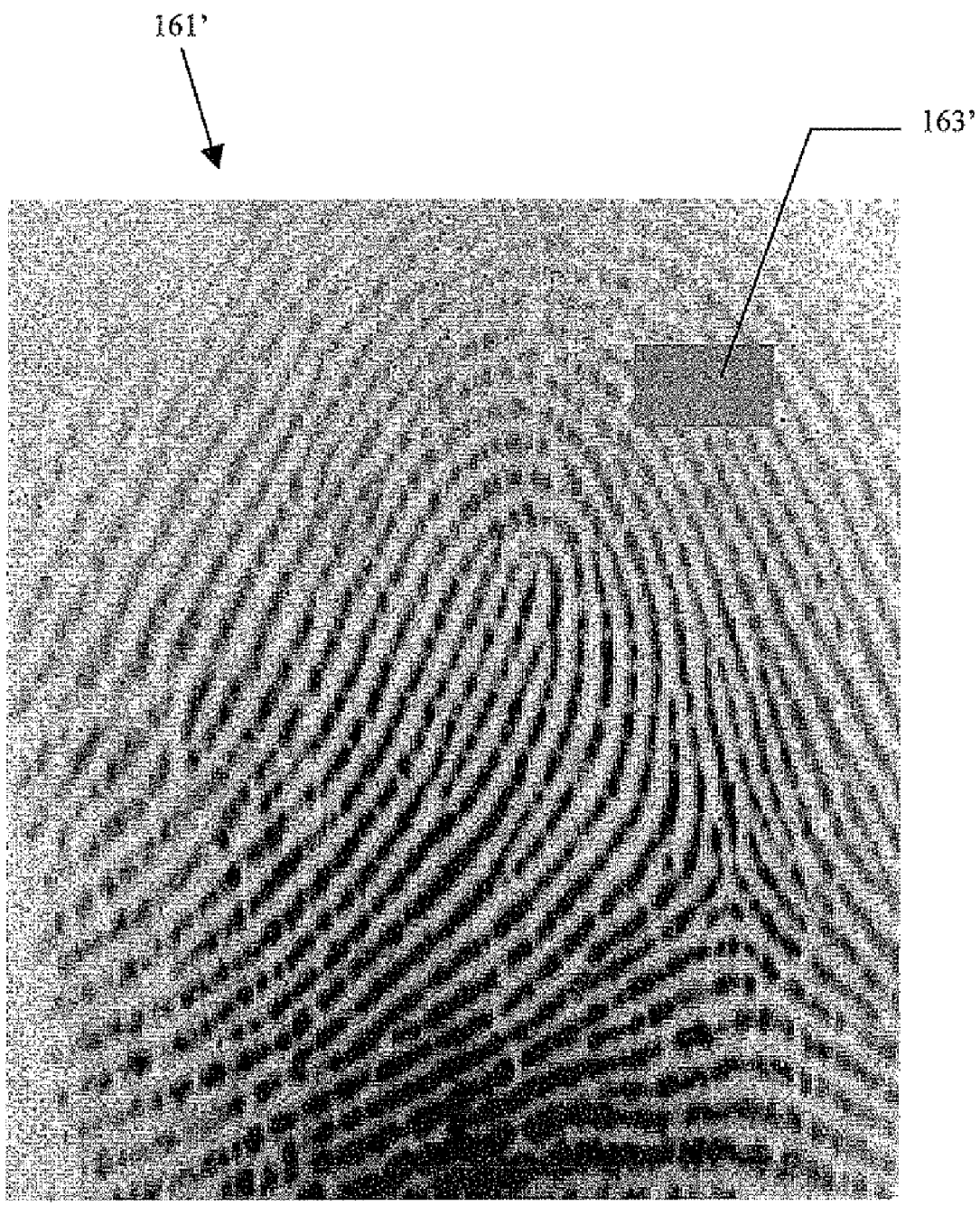
FIGS. 17A and 17B are close-up views of the reference fingerprint of FIG. 16A before and after inpainting in accordance with the invention to fill another void therein.
Figure 17B:
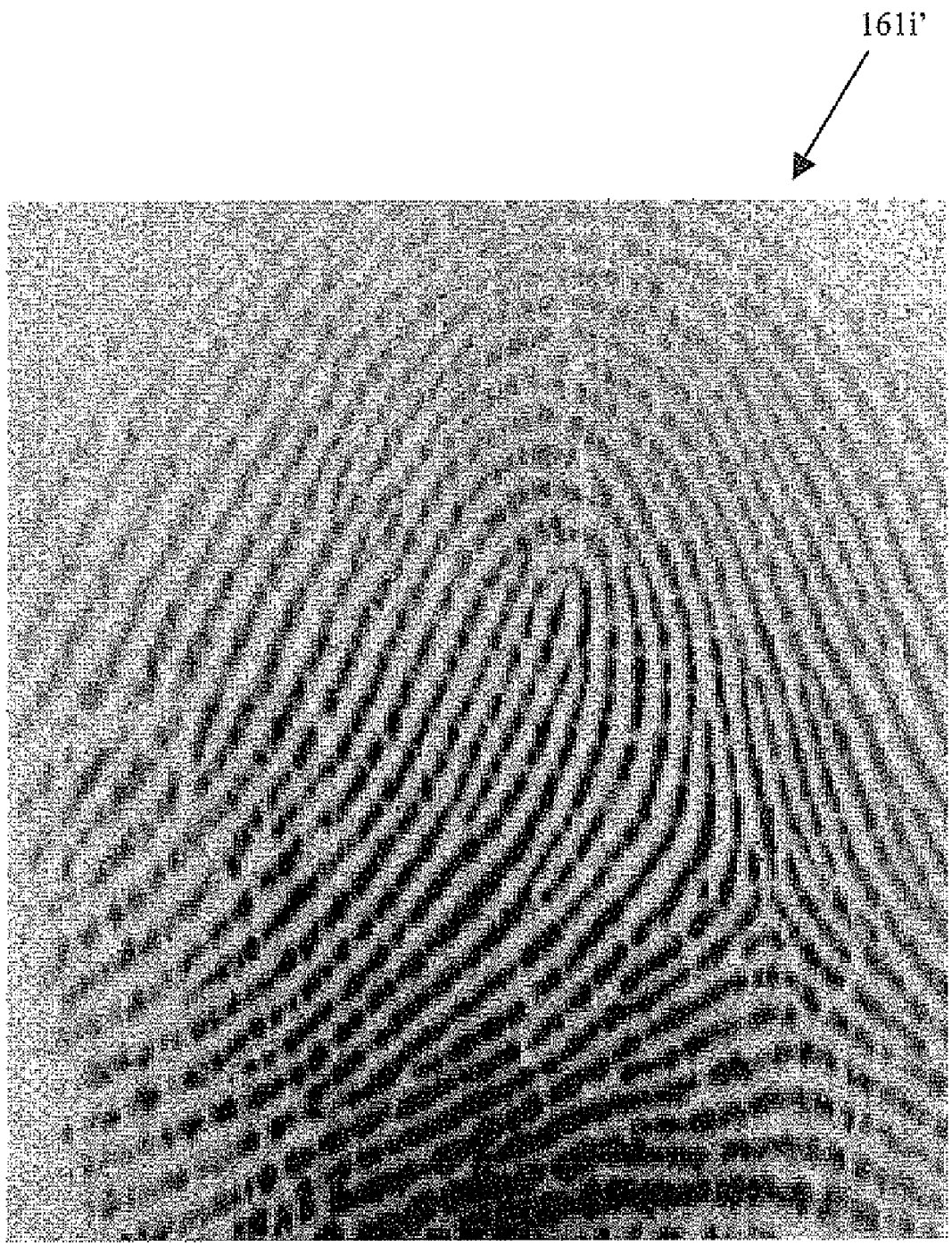
Figure 18A:
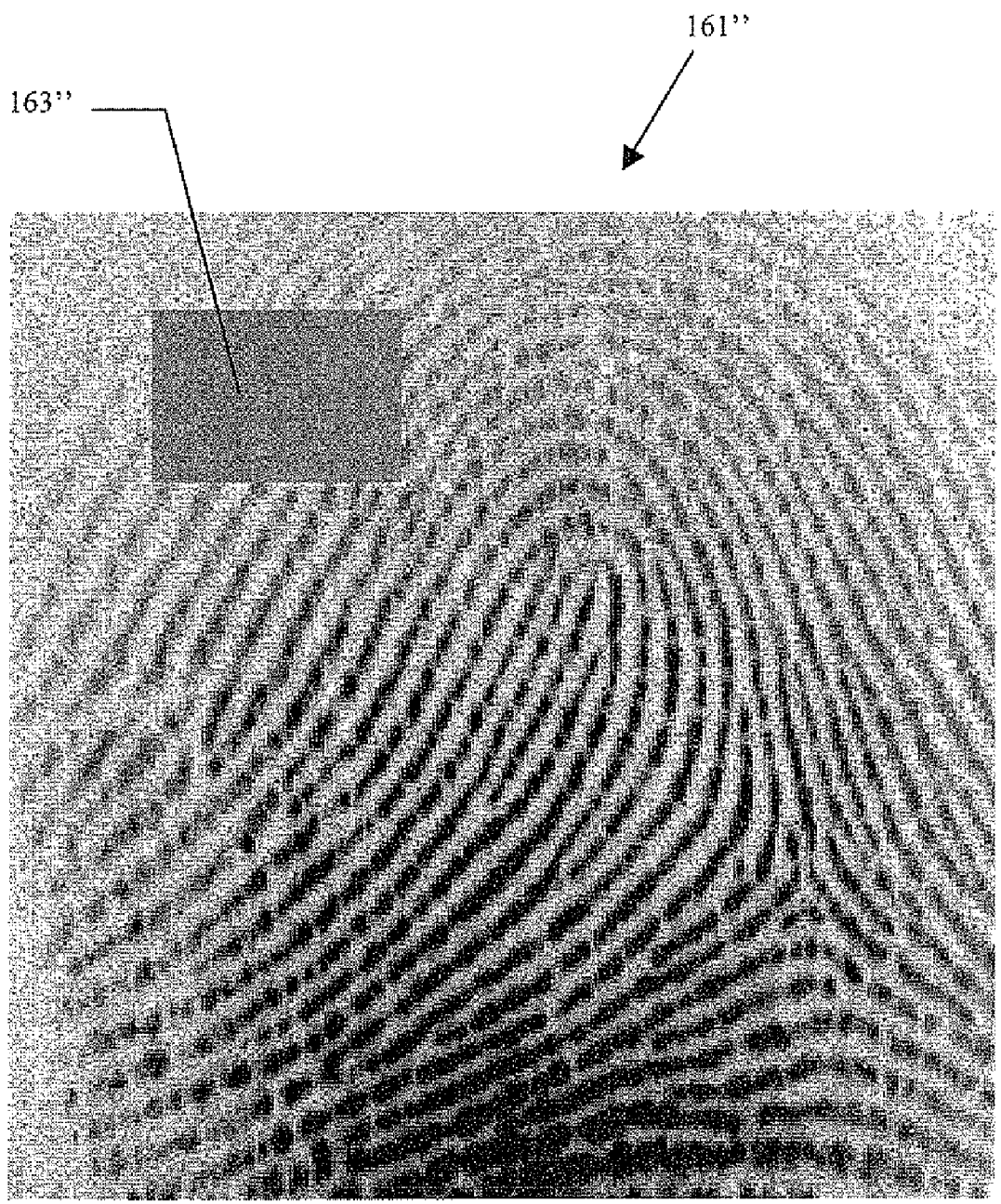
FIGS. 18A and 18B are close-up views of the reference fingerprint of FIG. 16A before and after inpainting in accordance with the invention to fill yet another void therein.
Figure 18B:
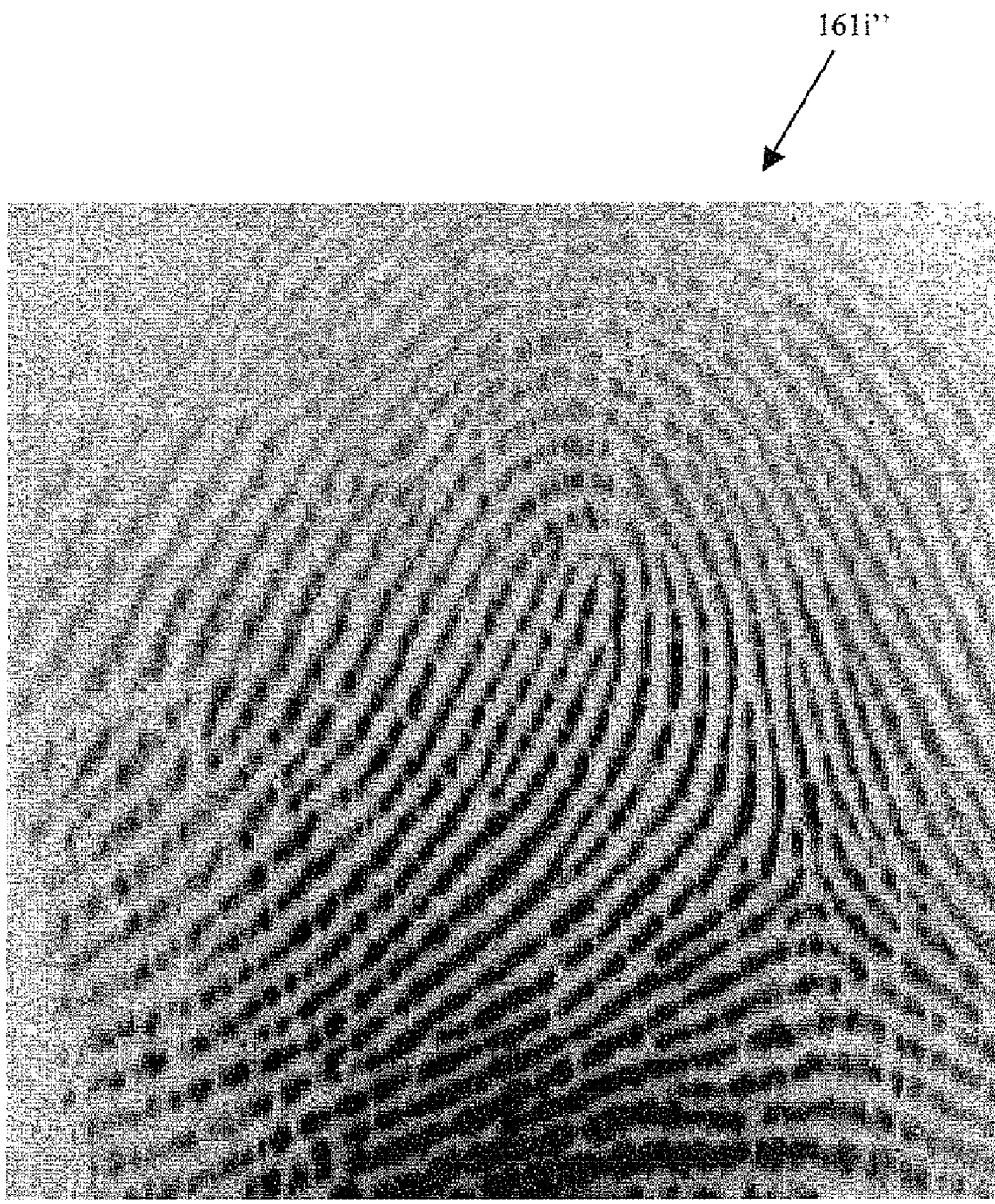
Figure 19A:
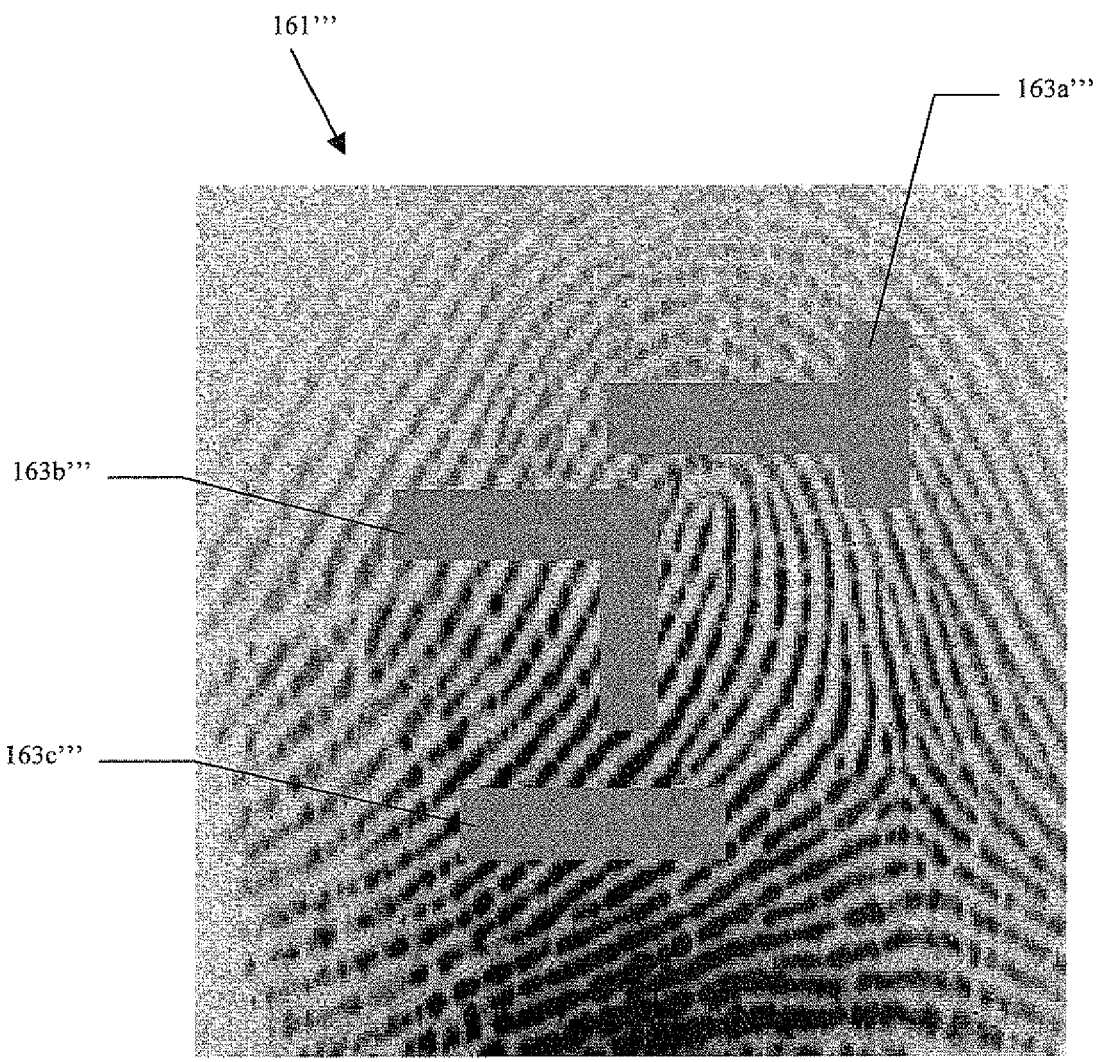
FIGS. 19A and 19B are close-up views of the reference fingerprint of FIG. 16A before and after inpainting in accordance with the invention to fill a plurality of voids therein.
Figure 19B:
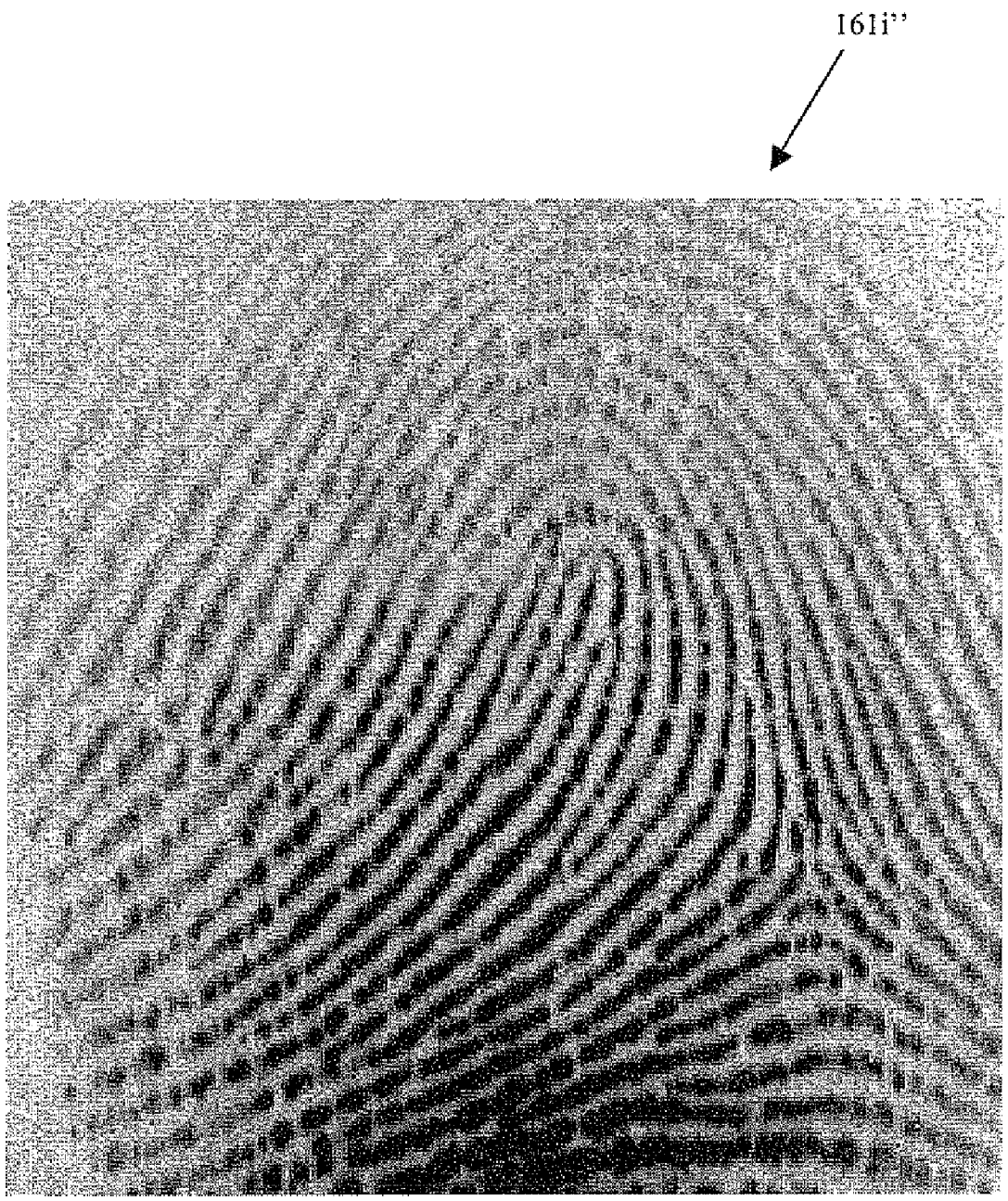

Turning now additionally to FIGS. 14-16C, a fingerprint processing system 20''' and associated method that advantageously uses the above-described techniques for inpainting voids 163 in a field of fingerprint data 160 is now described. It should be noted that reference herein to "fingerprint data" means digital data that corresponds to a given fingerprint or fingerprint image, but in FIGS. 16A-19B the images of actual fingerprints are provided for clarity of illustration (i.e., the "fingerprint data" is a digital representation of the fingerprint image shown in the drawings). Also, reference to fingerprint data 160i is to the fingerprint data 160 after inpainting has been performed to fill the void 163 (FIG. 16C).

The system 20''' illustratively includes a fingerprint database 21''' for storing fingerprint data 160 having one or more voids 163 therein. By way of example, the fingerprint data 160 may be collected from a finger 130''' by a fingerprint sensor 131''', such as an optical, ultrasonic, or capacitive (both active and capacitive) sensor, for example, as will be appreciated by those skilled in the art (Blocks 140-141). The fingerprint data 160 may also be collected from impressions of fingerprints at crime scenes, for example, which are converted to digital fingerprint data, as will also be appreciated by those skilled in the art. Thus, it will be appreciated that in some embodiments either the fingerprint database 21''' or the fingerprint sensor 131''' may be omitted, although they may also both be used in some embodiments as well.

The system 20''' further illustratively includes one or more processors 22''' that cooperates with the fingerprint database 21''' for inpainting data into the void(s) 163 in the fingerprint data 160 based upon propagating fingerprint contour data from outside the void into the void using the techniques described above, at Block 142. More particularly, in the case of a fingerprint, the contour data corresponds to elevated ridges 161 which define valleys 162 therebetween, similar to the elevated contours in terrain data (although on a smaller scale). Thus, the processor 22''' inpaints by propagating ridge (or valley) contour data from outside the void 163 along a direction of lines of constant ridge contour from outside the void into the void, as described above with reference to FIGS. 1-7D. Again, this is done iteratively until the void 163 is filled to the desired degree, at Block 143.

In some embodiments the fingerprint data 160 may be frequency domain data, such as may be collected by an ultrasonic fingerprint sensor, for example. Thus, in such embodiments the processor 22''' cooperates with the fingerprint database 21''' for inpainting frequency data into the frequency void 163 based upon propagating amplitude data for frequencies outside the frequency void into the frequency void, as described above with reference to FIGS. 8-13. Again, the inpainting may be performed based upon turbulent fluid flow modeling equations, such as Navier-Stokes equations.

In addition, the system 20''' may perform further fingerprint processing steps following data inpainting, including binarization, skeletonization, and/or minutiae extraction, for example (Block 144-145). As discussed briefly above, the minutiae extraction provides a template of minutiae features (e.g., arches, loops, whorls, bifurcations, endings, dots, islands, and ridge details such as pores, width, shape, etc.) that can be compared electronically with a plurality of fingerprint reference data sets or templates to determine one or more potential matches, at Block 146, thus concluding the illustrated method (Block 147). The fingerprint reference data sets may be stored in the database 21''' or elsewhere.

In accordance with one exemplary approach, the comparisons resulting in a particular threshold percentage of matching features may be flagged or otherwise presented to a human fingerprint expert to perform a final matching operation. The threshold may advantageously set to a level high enough to significantly reduce the amount of fingerprint reference sets the expert would otherwise have to manually examine, while still including enough reference sets to provide a desired confidence level, as will be appreciated by those skilled in the art. Of course, the processor 22''' may provide only the closest matching reference set as well, or simply confirm that given fingerprint data matches an authorized user fingerprint reference data set to a desired level of accuracy, such as in security applications, for example. A display 23''' may also be coupled to the processor 22''' for displaying fingerprint images produced thereby, as well as fingerprint reference data sets, for example.

The system processor 22''' therefore advantageously fills voids 163 including missing or "notched-out" data in fingerprint data 160 to provide improved matching capabilities. The inpainting may be performed as part of an automatic de-blur/de-noise pre-processing operation prior to binarization/skeletonization, as discussed above. The above-described approach may advantageously help restore/maintain ridge 161 structure within identified inpainted regions. The inpainting operations may also advantageously help repair smudged fingerprints, and advantageously provide the matching algorithm or examiner with more minutiae points to examine to provide a greater match confidence level.

In accordance with an exemplary approach, a global objective function may be applied for the inpainting operations that uses sampling at a coarser level to seed a finer level. Partitioning is performed to identify the area(s) that is not in the void 163, in accordance with the following terminology:
S=Image with hole (i.e., void),
H=Hole in S,
D=S-H,
H*=Repaired Hole in S*, and
S*=Inpainted Image.

A global coherence per patch sample is then obtained, where coherence=(S*|D). More particularly, $$\text{Coherence}(S^* | T^* = \sum_{p \in S^*} \max_{q \in T} s(W_p, V_q),$$

where p, q run over all space-time points and $W_p$, $V_q$ denote small 3D space-time patches from S and D, respectively. For sampling, the similarity measure is $$s(W_p, V_q) = e^{\frac{-d(W_p, V_q)}{2*\sigma^2}},$$

with a statistical distance given by:

$$d(W_p, V_q) = \Sigma \|W_p - V_q\|^2,$$

Additionally examples of inpainting are provided in FIGS. 17A, 17B and 18A, 18B, where a single void 163', 163'' in fingerprint data 161', 161'' has been inpainted using the above-described techniques to provide repaired fingerprint data 161i', 161i'', respectively. Still another more complex example is provided in FIGS. 19A, 19B, where a plurality of voids 163a'''-163c''' of different shapes and sizes are inpainted to provide repaired fingerprint data 161i''', as shown.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A fingerprint processing system comprising:
a fingerprint database configured to store fingerprint data having at least one void therein from missing fingerprint data; and
at least one processor configured to cooperate with said fingerprint database to inpaint data into the at least one void in the fingerprint data based upon propagating fingerprint contour data from outside the at least one void into the at least one void using a fluid flow model.

2. The fingerprint processing system of claim 1 wherein the fingerprint data comprises ridge contour data.

3. The fingerprint processing system of claim 2 wherein said at least one processor is configured to inpaint by propagating ridge contour data from outside the at least one void along a direction of lines of constant ridge contour from outside the at least one void into the at least one void.

4. The fingerprint processing system of claim 3 wherein said at least one processor is configured to iteratively propagate the ridge contour data from outside the at least one void into the at least one void.

5. The fingerprint processing system of claim 1 wherein the fingerprint data comprises frequency domain data, and the at least one void comprises at least one frequency void from missing fingerprint frequency data; and wherein said at least one processor is configured to cooperate with said fingerprint database to inpaint data into the at least one frequency void based upon propagating amplitude data for frequencies outside the at least one frequency void into the at least one frequency void.

6. The fingerprint processing system of claim 1 wherein said at least one processor is configured to inpaint based upon at least one turbulent fluid flow modeling equation.

7. The fingerprint processing system of claim 6 wherein the at least one turbulent fluid flow modeling equation comprises at least one Navier-Stokes equation.

8. The fingerprint processing system of claim 1 wherein said at least one processor is configured to further perform binarization following inpainting.

9. The fingerprint processing system of claim 1 wherein said at least one processor is configured to further perform skeletonization following inpainting.

10. The fingerprint processing system of claim 1 wherein said at least one processor is configured to further perform minutiae extraction following inpainting.

11. The fingerprint processing system of claim 1 wherein said at least one processor is configured to further compare inpainted fingerprint data with a plurality of fingerprint data reference sets to determine at least one potential matching set therefrom.

12. The fingerprint processing system of claim 1 further comprising a display coupled to said at least one processor and configured to display fingerprint images produced thereby.

13. A fingerprint processing system comprising:
a fingerprint sensor configured to collect fingerprint data having at least one void therein from missing fingerprint data; and
at least one processor configured to cooperate with said fingerprint sensor to inpaint data into the at least one void in the fingerprint data based upon propagating fingerprint contour data from outside the at least one void into the at least one void using a fluid flow model.

14. The fingerprint processing system of claim 13 wherein the fingerprint data comprises ridge contour data.

15. The fingerprint processing system of claim 14 wherein said at least one processor is configured to inpaint by propagating ridge contour data from outside the at least one void along a direction of lines of constant ridge contour from outside the at least one void into the at least one void.

16. The fingerprint processing system of claim 15 wherein said at least one processor is configured to iteratively propagate the ridge contour data from outside the at least one void into the at least one void.

17. The fingerprint processing system of claim 13 wherein the fingerprint data comprises frequency domain data, and the at least one void comprises at least one frequency void from missing fingerprint frequency data; and wherein said at least one processor is configured to cooperate with said fingerprint database to inpaint data into the at least one frequency void based upon propagating amplitude data for frequencies outside the at least one frequency void into the at least one frequency void.

18. The fingerprint processing system of claim 13 wherein said at least one processor is configured to inpaint based upon at least one turbulent fluid flow modeling equation.

19. A fingerprint processing method comprising:
providing fingerprint data having at least one void therein from missing fingerprint data; and
processing the fingerprint data with a processor to inpaint data into the at least one void in the fingerprint data based upon propagating fingerprint contour data from outside the at least one void into the at least one void using a fluid flow model.

20. The method of claim 19 wherein the fingerprint data comprises ridge contour data.

21. The method of claim 20 wherein processing comprises propagating ridge contour data from outside the at least one void along a direction of lines of constant ridge contour from outside the at least one void into the at least one void.

22. The method of claim 21 wherein processing comprises iteratively propagating the ridge contour data from outside the at least one void into the at least one void.

23. The method of claim 19 wherein the fingerprint data comprises frequency domain data, and the at least one void comprises at least one frequency void from missing fingerprint frequency data; and wherein processing comprises inpainting data into the at least one frequency void based upon propagating amplitude data for frequencies outside the at least one frequency void into the at least one frequency void.

24. The method of claim 19 wherein processing comprises inpainting based upon at least one turbulent fluid flow modeling equation.

25. A non-transitory computer-readable medium having computer-executable instructions for causing a processor to perform at least one step comprising:
inpainting data into at least one void in fingerprint data from missing fingerprint data based upon propagating fingerprint contour data from outside the at least one void into the at least one void using a fluid flow model.

26. The non-transitory computer-readable medium of claim 25 wherein the fingerprint data comprises ridge contour data.

27. The non-transitory computer-readable medium of claim 26 wherein inpainting comprises propagating ridge contour data from outside the at least one void along a direction of lines of constant ridge contour from outside the at least one void into the at least one void.

28. The non-transitory computer-readable medium of claim 27 wherein inpainting comprises iteratively propagating the ridge contour data from outside the at least one void into the at least one void.

29. The non-transitory computer-readable medium of claim 25 wherein the fingerprint data comprises frequency domain data, and the at least one void comprises at least one frequency void; and wherein inpainting comprises inpainting data into the at least one frequency void based upon propagating amplitude data for frequencies outside the at least one frequency void into the at least one frequency void.

30. The non-transitory computer-readable medium of claim 25 wherein inpainting comprises inpainting based upon at least one turbulent fluid flow modeling equation.

* * * * *